United States Patent [19]

Lorenzo

[11] 4,148,434
[45] Apr. 10, 1979

[54] METHOD OF PRODUCING A BINARY CODE AND MEANS FOR USING THE SAME

[75] Inventor: John L. Lorenzo, Southbury, Conn.

[73] Assignee: Pitney-Bowes, Inc., Stamford, Conn.

[21] Appl. No.: 857,303

[22] Filed: Dec. 5, 1977

[51] Int. Cl.$^2$ .................. G06K 7/00; G06K 7/08; G06K 7/10; G06K 19/06

[52] U.S. Cl. ............................. 235/435; 235/449; 235/454; 235/458; 235/480; 235/494; 360/40

[58] Field of Search .............. 235/429, 435, 441, 442, 235/454, 449, 458, 487, 489, 493, 494; 360/40; 250/555

[56] References Cited

U.S. PATENT DOCUMENTS

| 3,064,887 | 11/1962 | Waters et al. | 235/458 |
| 3,114,144 | 12/1963 | Woo | 235/458 |
| 3,345,500 | 10/1967 | Russell | 235/442 |

Primary Examiner—Daryl W. Cook
Attorney, Agent, or Firm—Peter Vrahotes; William D. Soltow, Jr.; Albert W. Scribner

[57] ABSTRACT

A method of representing decimal numbers in a quasi binary coded decimal (BCD) form is disclosed along with apparatus for using the same. The value assigned to a combination of binary bits is dependent on the location of the combination on the medium which is encoded. Use is made of the direction of motion of the medium to determine the position and hence the decimal value of specific combinations of binary bits. By interpreting certain combinations of bits in two different ways, an additional binary bit of information can be obtained from a given number of bits increasing the obtainable information from conventional BCD codes.

13 Claims, 4 Drawing Figures

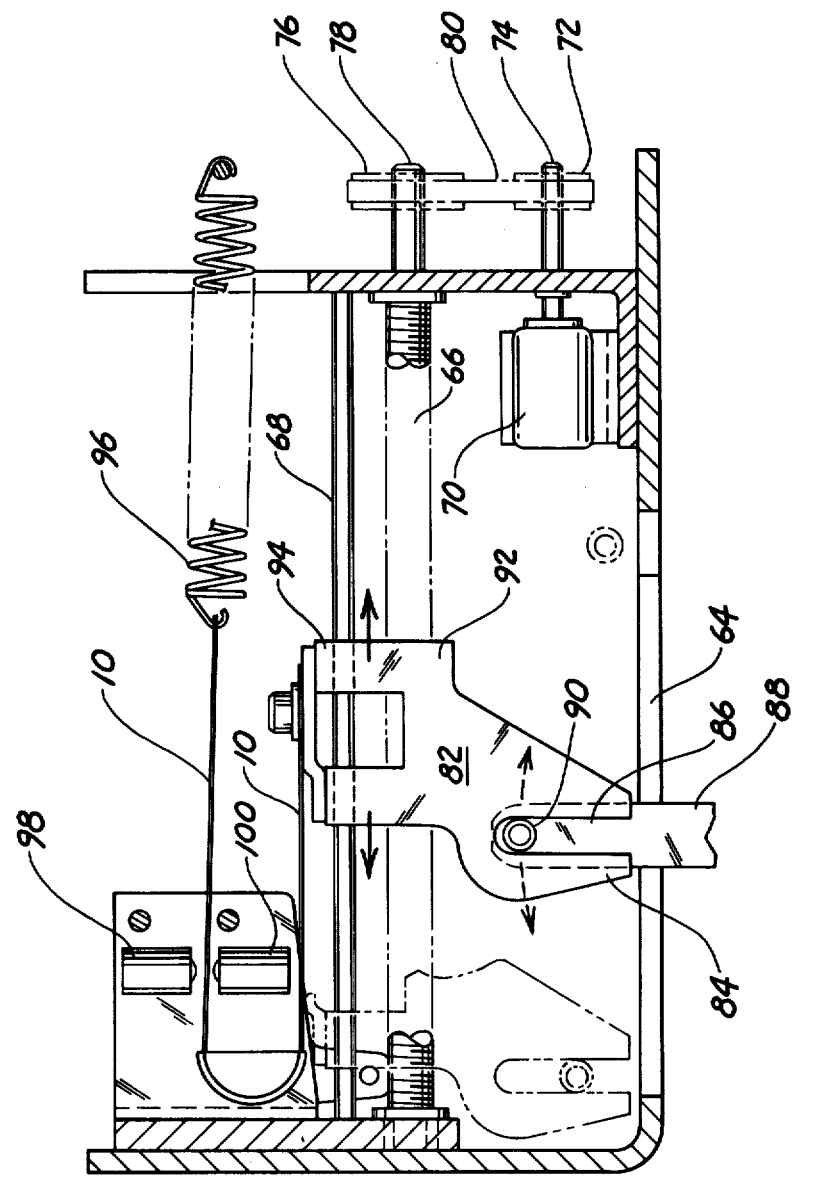

METHOD OF PRODUCING A BINARY CODE AND MEANS FOR USING THE SAME

BACKGROUND OF THE INVENTION

1. Field of the Invention

This invention relates to methods of encoding digital data into binary form, and decoding such binary data. The binary system, using 1's (ones) and 0's (zeroes) to represent alphanumeric data, is well known in the art. Currently, two types of binary code are used most commonly: the Baudot code, a five-hole code for representing alphanumeric characters; and the binary coded decimal (BCD) code, used to represent decimal numbers in binary form.

From the binary system's inception, the number of bits available for encoding was often less than the number of bits required to represent a letter or number. The original five-hole Baudot code, for example, permitted only 32 unique combinations, insufficient to represent the entire 26-character English alphabet in both upper case and lower case form. The BCD code, in which any decimal number can be represented in binary form, requires a great many digits to represent numbers. For example, four digits, or "bits" are needed to represent the decimal number 8.

Historically, solutions to this problem have been attempted in two categories: expanding the capacity of the encoding medium, or modifying the code interpreting system. When the size of the system that includes this coding method is inflexibly determined due to cost considerations or physical limitations, only the latter category of solutions is viable.

DESCRIPTION OF THE PRIOR ART

One of the earliest methods of binary code interpretation, still in use today, reserved unique combinations or groups of punched holes for "letter shift" and for "figure shift" control characters. The receiving, decoding machine was conditioned to interpret all holes that followed a "letter shift" character as letters, and all holes that followed a "figure shift" character as numerals and special characters. In this way, each combination of holes served double duty; its definition was contingent on the last control character encountered.

Usage of the "letter shift" and "figure shift" control characters is typified by U.S. Pat. No. 2,619,533. An extension of this method, which uses more than two control characters, is disclosed in U.S. Pat. No. 3,530,239. Unfortunately, this class of inventions has one major drawback in practice: control characters tend to be encoded an inordinate number of times during the course of utilizing the system.

A method of using colored inks to differentiate the decimal equivalent of binary codes is shown in U.S. Pat. No. 3,486,006; U.S. Pat. No. 3,666,946 teaches the use of different photoluminescent inks to differentiate among the values of a given binary code. The disadvantage of these systems is the cost of sophisticated equipment required to discern the ink colors. U.S. Pat. No. 3,317,715 discloses using the space between columns and above and below the punched holes to store additional information on magnetic strips. This method requires the use of a magnetic read head, which is considered impractical for many applications.

The method disclosed in U.S. Pat. No. 2,836,653 determines whether uni-directional motion of a punched paper tape is present, but makes no use of this information beyond sounding an alarm when the tape ceases to move. Finally, and most recently, U.S. Pat. No. 3,968,349 makes use of the motion of the medium, but only to orient the electronic circuitry to accept data read in one direction or another. In that system, each binary code combination represents only one decimal value; the direction of medium motion information is not used to augment the existing encoded bits.

SUMMARY OF THE INVENTION

Means and methods have been devised for providing additional bits of information to a binary code by assigning decimal values to binary codes on the basis of the location of the codes on the medium. Use is made of the direction of motion of the medium to determine the position and hence the decimal value of specific combinations of binary bits.

BRIEF DESCRIPTION OF THE DRAWING

FIG. 4 is a cross-sectional, longitudinal, partially diagrammatic view of an apparatus with binary tape decoding means which may utilize the instant invention.

DETAILED DESCRIPTION OF INVENTION

The conventional binary coded decimal (BCD) code allows two values (0 and 1) to be represented by each binary digit, or bit. The number of possible combinations that can be constructed from N bits is $2^n$. For example, a conventional 3-bit BCD code can be used to represent up to eight ($2^3=8$) unique decimal values.

Figures 1, 2:
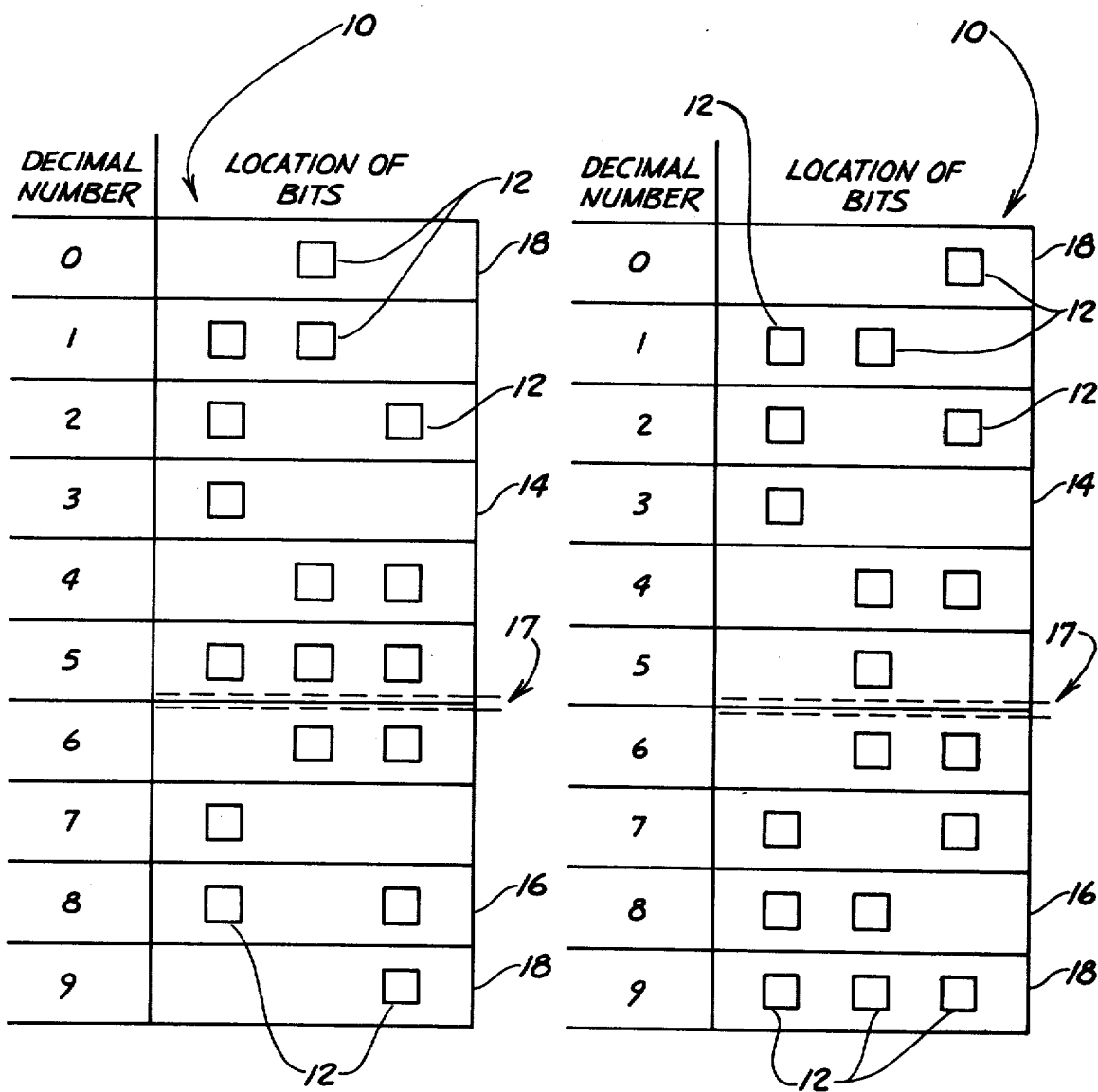
FIG. 1 is a plan view of a medium in the form of a punched tape that illustrates a 3-bit quasi BCD code in accordance with the instant invention.
FIG. 2 is a view identical to FIG. 1 but showing an alternative embodiment of a 3-bit quasi BCD code.

FIG. 1 depicts one of many possible 3-bit quasi BCD codes on an encodable tape 10 that can be used to represent more than eight decimal values. The expanded representation is accomplished in this system by using certain binary combinations twice, the value being dependent upon the direction of tape movement and the previously read code immediately prior to the decoding of the binary code or upon the location of the code on the tape. In particular, the binary code 010 represents decimal number 2 and also represents number 8. Similarly, numbers 3 and 7 are both represented by the same binary code 011, and numbers 4 and 6 are both represented by the same code 100.

Other quasi BCD coding schemes may be used to accomplish the same result as, for example, the code shown in FIG. 2. The number of bits used in such a code is not intended to be limited to three, but is used here merely for purposes of instruction.

The tape 10 shown in FIG. 1 is a physical manifestation of the quasi BCD code used in this description. The tape may be fashioned from any material; the bits of information may be holes in the tape used with photo-detecting apparatus, or magnetizable material used with electromagnetic read heads, or any other detection method which is well known in the art.

The first six decimal numbers (0–5) are represented in ascending numerical sequence by unique combinations, not necessarily forming a conventional code, shown generally at 12; the squares, or holes, representing zeros and the solid locations representing ones. These six combinations can be considered to form the first part 14 of the tape. The remaining combinations, representing decimal numbers 6-9, form the second part 16 of the tape. Line 17 represents an imaginary line that separates the first part of the tape 14 from the second part 16.

In general, the code is such that the combinations are arranged to represent ascending decimal values from the top of the tape 10, as seen in FIGS. 1 and 2, to the bottom of the first part of the tape 14, directly below the code, representing number 5 in this case. Each combination encoded on the first part of the tape 14 is unique with respect to every other combination encoded on that part.

The second part of the tape 16 is comprised of combinations of bits, some of which are identical in form to combinations used in the first part of the tape 14. While the decimal values that these combinations represent increases from the top of the second part of the tape 16 to the bottom of the tape, the duplicated combinations of bits must represent ever decreasing values of combinations used in the first part of the tape 14. In the tape 10 shown in FIG. 1, for example, arbitrary combinations of bits represent increasing decimal values on the second part 16 of the tape (i.e., 6,7,8), while the same combinations represent decreasing decimal values on the first part 14 of tape (i.e., 4,3,2).

Each combination encoded on the second part of the tape 16 is unique with respect to every other combination encoded on that part. This specific arrangement of combinations of bits, as well as the fact that both combinations of bits located at the tape endpoints 18 are unique, are required only by the decoding system hereinafter described; other configurations for a quasi BCD code may be readily devised for use in other decoding systems.

Figure 3:
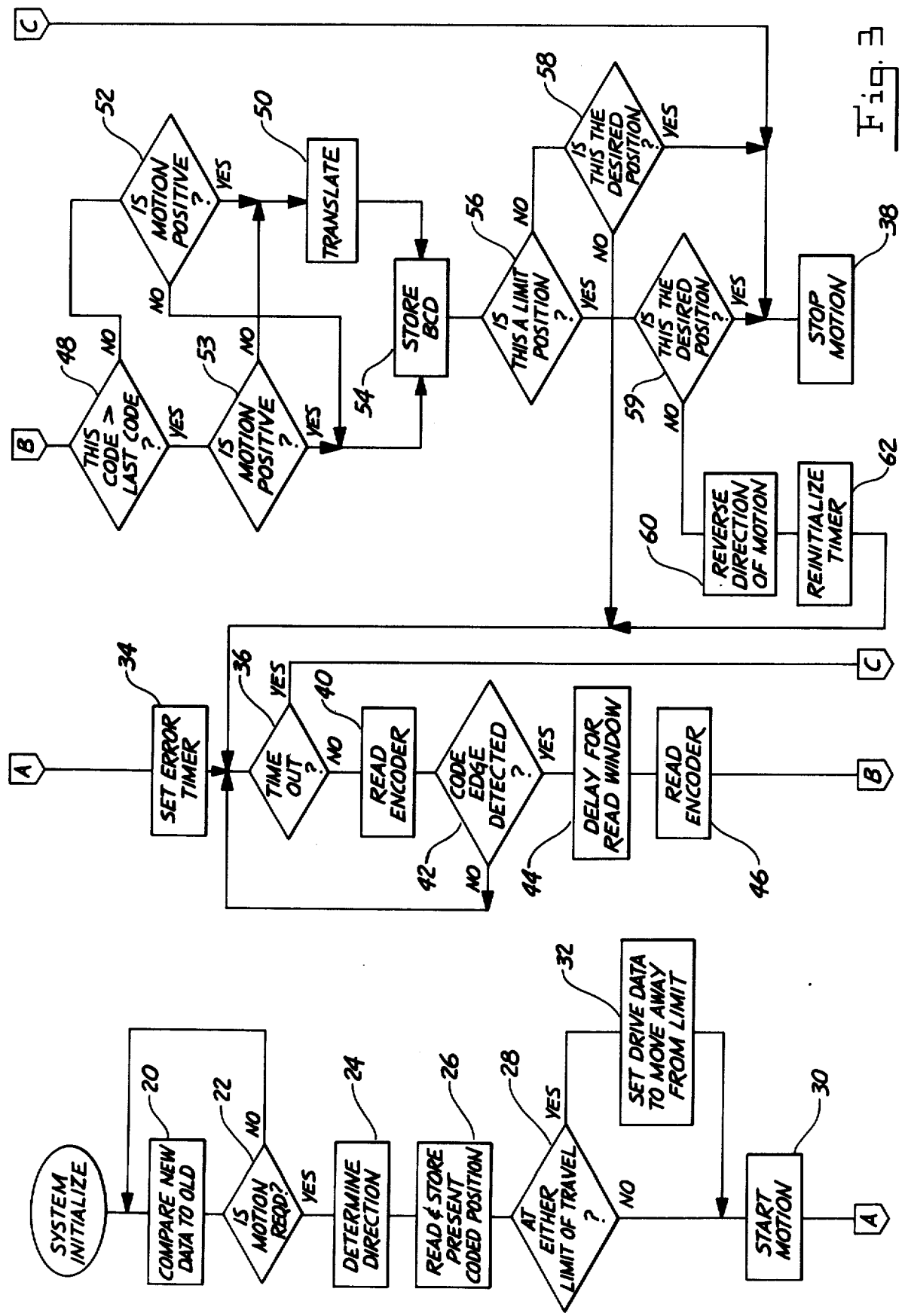
FIG. 3 is a flow diagram depicting the logic used to evaluate the decimal value of binary information bits.

Referring now also to FIG. 3, a flow diagram is shown representing circuitry wherein the last decimal value handled by the system is compared to the next, desired value by a comparator 20. If these two values are not equal, a determination is made by a logic system 22 that the tape must be moved to position another combination of bits under the read mechanism. The direction of motion is determined by a direction determination circuit 24, the present position is read and stored in a memory location 26 and, if an endpoint of the tape 10 is not detected by an endpoint code detector 28, tape motion is initiated by a power driver circuit 30. If the tape 10 is positioned at an endpoint, however, the direction of motion is set by a reverse drive circuit 32 so as to initiate motion away from that endpoint.

An electronic timer circuit 34 is set to provide a time slot for locating the proper code. If the timer has not timed out within a predetermined time interval, as detected by a time-out detector 36, tape motion will cease by a power disable circuit 38. Otherwise, system operation will continue.

An electronic read signal is polled by an input circuit 40 to determine whether the leading edge of one or more bits has been sensed. If no edge has been detected by an edge detector 42, the timer circuit 34 is again checked and another read signal is polled by input circuit 40. Once a leading edge is detected, motion of the tape continues in the same direction, and after a short delay caused by a delay circuit 44 another read signal is polled by a read encoder 46. The delay between pollings of read signals is required to ensure that all bits in the combination are in a suitable position for detection. Otherwise, in the case of a slight mis-alignment of bits, a leading edge of one bit could trigger a mis-read.

The present code is compared to the last code stored in memory by a comparator 48. Translation of the present code by a look-up table or algorithm 50 may be required, depending both on the value of the present code compared to the code stored in memory 48 and on the direction of tape motion as indicated by a motion detector 52 and 53. Table 1 shows the relationship among present code, code stored, direction of tape motion, and whether code translation is required. The system determines where the combination of bits is located on the tape by considering the present code compared to the last code stored in memory and the direction of tape motion.

Table 1

| Present Value of Code | Translation Parameters | |
|---|---|---|
| | Direction of Motion | Translation |
| Greater than Stored Value | Positive | Not Required (1st part of tape) |
| Greater than Stored Value | Negative | Required (2nd part of tape) |
| Less than Stored Value | Positive | Required (2nd part of tape) |
| Less than Stored Value | Negative | Not Required (1st part of tape) |

Referring again to FIG. 1, it will be noticed that the code representing the decimal value 3 on the first part of the tape 14 is the same code as that representing the decimal value 7 on the second part of the tape 16 in this embodiment. If the direction of tape motion is positive (i.e., from 0 towards 9) and the binary code stored in memory is a larger value (100) than the present code (011), then the present code must be located on the second part of the tape 16. The code is translated by a circuit 50, via algorithm or look-up table, to its equivalent decimal value (7) and the binary and decimal codes are stored in memory 54. If the direction of the tape is negative, however, and the binary code stored in memory is a larger value (100) than the present code (011), then the present code must be located on the first part of the tape 14. The untranslated binary and decimal codes are stored in memory 54. The decimal value that the code represents is 3.

Once the decimal value of the code has been determined, a decision to continue tape motion in the present direction of motion, to reverse the direction, or to stop the motion, is made based on two factors: whether the present code is located at an endpoint 18 of the tape and whether the present position is the desired position. Table 2 shows the relationship among endpoint, which is indicated by an endpoint code detection circuit 56, desired position indicated by a position indicator 58 and 59, and how motion of the tape is affected.

Table 2

| Position of Tape | Motion of Tape | |
|---|---|---|
| | Present Code | Motion of Tape |
| Endpoint | Desired Position | Stop Motion |
| Endpoint | Wrong Position | Reverse Direction |
| Intermediate Point | Desired Position | Stop Motion |
| Intermediate Point | Wrong Position | Continue Motion |

Tape motion is continuous until halted by a power disable circuit 38 when the desired tape position is reached.

If the tape motion is reversed by a motion direction circuit 60, the reinitialize timer circuit 62 causes the timer circuit 34 to be reset. If the tape 10 is in either direction of motion, the next code is sensed by the read encoder circuit 40. The reading process is therefore begun again with a new combination of bits moved into position.

Referring now to FIG. 4, a preferred embodiment of a decoding apparatus is shown. A housing 64 supports a longitudinally mounted threaded lead screw 66 and a guide bar 68 parallel to the lead screw. A motor 70 is connected to a pulley 72 by means of the motor output shaft 74. The lead screw 66 is connected to a lead screw pulley 76 by means of a shaft 78. A belt 80 is trained about the pulleys 72, 76 to provide drive to the lead screw 66. A slidable carriage 82 has provisions for being moved by the lead screw 66. The slidable carriage 82 has a bore 84 and a slot 86 which form a channel into which a rod 88 having a pin 90 is inserted. The slidable carriage 82 is mounted on the lead screw 66 by a threaded bore 92 to be driven thereby and to the guide bar 68 by a bore 94. Attached to the slidable carriage 82 is one end of an encoded tape 10. The other end of the tape 10 is attached to a spring 96. The spring 96 is fixedly mounted on the housing 64. The tape 10 is threaded between a light source 98 and a photocell array 100. The light source 98 and the photocell array 100 in combination comprise an optical detection system.

In operation, the motor 70 rotates the pulley 72 via shaft 74. The rotating pulley 72 drives the lead screw pulley 76 via belt 80. The lead screw 66 is driven, thereby positioning the slidable carriage 82 mounted thereon. As the slidable carriage 82 moves in a longitudinal direction, the end of the encoded tape 10 and the rod 88 attached to the slidable carriage are moved in the same direction. The tape 10 is pulled by the spring 96 as the slidable carriage 82 moves in the opposite direction. Codes on the tape 10 are sensed by the optical detection system as the tape moves between the light source 98 and the photocell array 100. Digital logic, represented by FIG. 3, is used to control the motion of the motor 70 based on the code on the tape 10 detected by the photocell array 100. The rod 88 is positioned in response to the slidable carriage 82, controlled by the tape 10, and is used to set the lever of a digital device, not shown.

From the foregoing discussion, it will be evident to those skilled in the art that a novel method of representing decimal numbers in a quasi binary coded decimal form is herein disclosed. This method may be applied to similar systems, without respect to the number of binary bits in the code, the specific arrangement of combinations of bits on the encodable medium, other systems of detecting the bits (e.g., magnetic, optical), or the electronic circuitry required to implement the logic herein described.

Additionally, it will be appreciated that more than two combinations of codes may be used for the purpose of expanding the number of letters or numbers that may be represented by a binary or other code. The invention has been described showing a combination of two sets of three-bit groups wherein values are assigned to one group or the other depending upon location on a medium or with regard to the direction of travel of the medium. It will be appreciated that more than two such sets may be applied to a medium with the values being assigned to location or to distance of travel as well as direction of travel. Using appropriate circuitry and means for interpreting the location or extent of travel of the medium, it would be possible to represent an infinite number of letters or numbers by a BCD, binary, or other code, such as a three-bit code.

What is claimed is:

1. In a method of providing digital information in binary code upon an elongated encodable medium, the steps comprising:
   (a) encoding said medium by placing on it a plurality of longitudinally spaced combinations of information bits;
   (b) displacing said medium in a decoder having means for moving said medium in both longitudinal directions; and
   (c) assigning to said combinations a value dependent upon the direction of motion of said medium.

2. In a method of generating digital information in binary form upon an elongated medium, the steps comprising:
   (a) differentiating the encodable medium into two portions; and
   (b) placing combinations of information bits on said portions, so that each combination of each portion has a unique sequence of information bits from every other combination within the portion and duplicating at least some of the information bit combinations in the two portions.

3. The method of claim 2 including the steps of:
   (a) placing said combinations in the first portion of the encodable medium in ever ascending order such that the value assigned to a given combination is greater than the value assigned to the previous combination; and
   (b) placing said combinations in the second portion of the encodable medium in ever descending order, such that the value assigned to a given combination is less than the value assigned to the previous combination.

4. In a method of generating digital information, the steps comprising:
   (a) providing an elongated encodable medium;
   (b) encoding said medium by placing on it a plurality of longitudinally spaced combinations of information bits;
   (c) displacing said medium in both longitudinal directions; and
   (d) assigning to the combinations a value dependent upon the location of said combinations on said medium.

5. The method of claim 4 including the steps of:
   (a) differentiating the encodable medium into two portions; and
   (b) placing said combinations in said portions, each combination of each portion having a unique sequence of information bits from every other combination within the portion and duplicating at least some of the information bit combinations in the two portions.

6. The method of claim 5 including the steps of:
   (a) placing said combinations in the first portion of the encodable medium in ever ascending order such that the value assigned to a given combination is greater than the value assigned to the previous combination; and
   (b) placing said combinations in the second portion of the encodable medium in ever descending order, such that the value assigned to a given combination is less than the value assigned to the previous combination.

7. In an apparatus for generating information in binary form, the combination comprising:
(a) a medium having thereon a plurality of longitudinally spaced combinations of information bits, each combination comprising a plurality of laterally spaced information bits at least one of said combinations being duplicated at opposite longitudinal parts of said medium;
(b) a decoder spaced adjacent to the surface of said medium;
(c) means for moving said medium relative to said decoder; and
(d) means for determining the direction of motion of said medium.

8. The apparatus of claim 7 including means for:
(a) differentiating the encodable medium into two portions; and
(b) placing said combinations in said portions, each combination of each portion being unique from every other combination within the portion but duplicating one of the combinations in the second portion.

9. An apparatus for decoding a binary code comprising:
(a) a housing;
(b) a spring mounted on said housing;
(c) a threaded lead screw and a guide bar longitudinally mounted on said housing;
(d) a slidable carriage mounted on said threaded lead screw;
(e) a channel in said slidable carriage;
(f) a settable rod mounted in said channel;
(g) an elongated encodable medium, one end of which is attached to said slidable carriage, and another end of which is attached to said spring;
(h) an optical detection system through which said encodable medium is movably threaded;
(i) digital logic circuitry to determine direction of motion of said slidable carriage based on signals generated by said optical detection system; and
(j) means for rotating said threaded lead screw in one or the other longitudinal directions, responsive to instructions provided by said digital logic circuitry.

10. In an apparatus for generating information in binary form, the combination comprising:
(a) a medium having an encoded surface with a plurality of longitudinally spaced combinations of bits, each combination comprising a plurality of laterally spaced bits at least one of said combinations being duplicated at opposite longitudinally parts of said medium;
(b) a decoder spaced relative to the surface of said medium;
(c) means for moving said medium relative to said decoder; and
(d) means for determining the direction of motion of said medium.

11. The apparatus of claim 10 including means for assigning values to said combinations in response to the amount of travel of said medium.

12. The apparatus of claim 10 wherein said combinations have the same number of bits.

13. A system for generating a binary code, comprising:
(a) a medium having a code disposed thereon, said code having at least one duplicate symbol, the duplicate symbol having an alternate value which is dependent on its position on said medium;
(b) means for transporting the medium in either end of two directions; and
(c) means disposed adjacent the medium for determining the direction of movement of said medium and in response to this determination making a further determination as to a value of a duplicate symbol based upon the direction of movement.

* * * * *